(12) United States Patent
Starich et al.

(10) Patent No.: US 11,878,245 B2
(45) Date of Patent: *Jan. 23, 2024

(54) SURFACING PRERECORDED GAMEPLAY VIDEO FOR IN-GAME PLAYER ASSISTANCE

(71) Applicant: Sony Interactive Entertainment Inc., Tokyo (JP)

(72) Inventors: Michael Starich, San Mateo, CA (US); Rae Yip, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/869,390

(22) Filed: Jul. 20, 2022

(65) Prior Publication Data

US 2022/0370907 A1 Nov. 24, 2022

Related U.S. Application Data

(63) Continuation of application No. 16/811,804, filed on Mar. 6, 2020, now Pat. No. 11,395,968.

(51) Int. Cl.
*A63F 13/5375* (2014.01)
*A63F 13/35* (2014.01)
*A63F 13/86* (2014.01)

(52) U.S. Cl.
CPC .......... *A63F 13/5375* (2014.09); *A63F 13/35* (2014.09); *A63F 13/86* (2014.09)

(58) Field of Classification Search
None
See application file for complete search history.

(56) References Cited

U.S. PATENT DOCUMENTS

2009/0208181 A1* 8/2009 Cottrell .................. A63F 13/86
386/278
2016/0317927 A1* 11/2016 Miyamoto ............ A63F 13/497

* cited by examiner

*Primary Examiner* — Damon J Pierce
(74) *Attorney, Agent, or Firm* — Penilla IP, APC

(57) ABSTRACT

A method, including: receiving videos generated from sessions of a video game respectively associated to first client devices; for each video, determining location metadata that identifies spatial locations in a virtual environment of the video game at which gameplay depicted by the video occurs, the spatial locations defining a path of the gameplay; during a session of the video game associated to a second client device, determining a current spatial location in the virtual environment of gameplay occurring in the session; filtering the videos based on the current spatial location to identify one or more videos having paths that intersect a region proximate to the current spatial location; presenting, over the network, the identified one or more of the videos at the second client device; continuously tracking updates to the current spatial location and responsively updating the filtering of the videos based on said updates to the current spatial location.

20 Claims, 10 Drawing Sheets

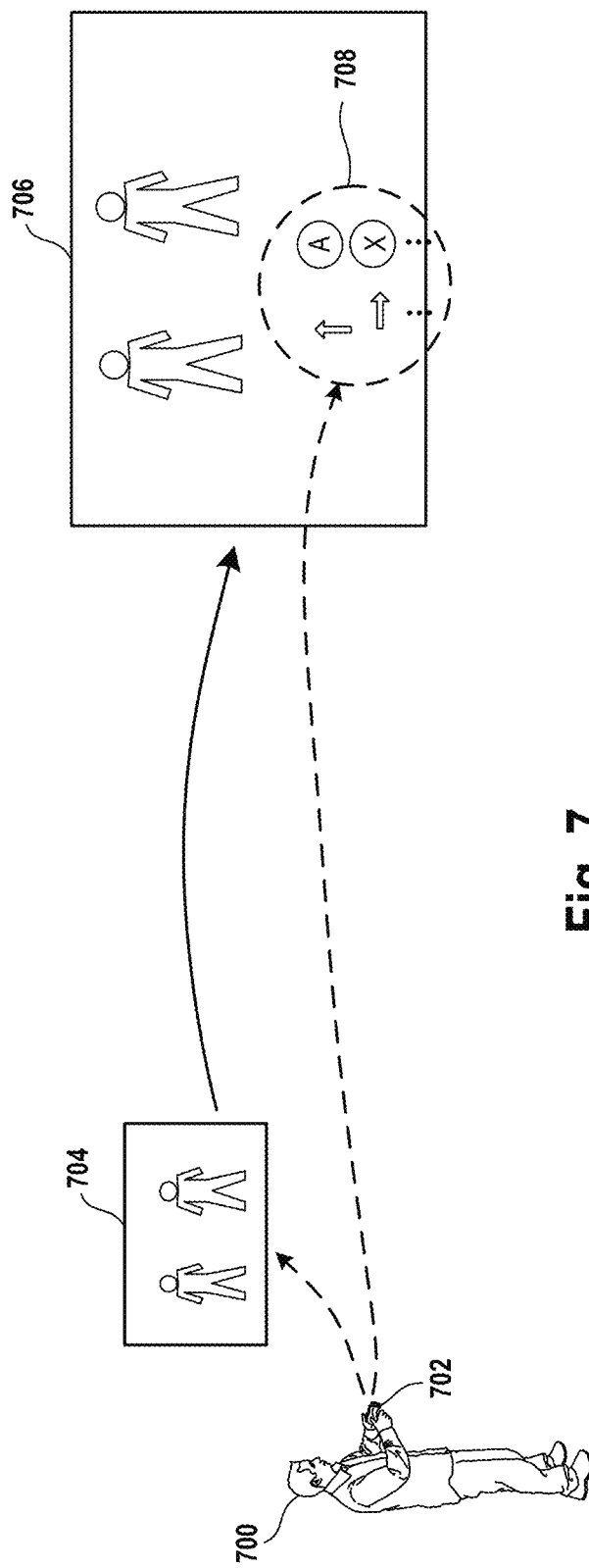

SURFACING PRERECORDED GAMEPLAY VIDEO FOR IN-GAME PLAYER ASSISTANCE

CLAIM OF PRIORITY

This application is a continuation of and claims priority to and the benefit of commonly owned, patent application, U.S. application Ser. No. 16/811,804, filed on Mar. 6, 2020 (U.S. Pat. No. 11,395,968), entitled "SURFACING PRERECORDED GAMEPLAY VIDEO FOR IN-GAME ASSISTANCE" the disclosure of which is incorporated herein in its entirety for all purposes.

Field of the Disclosure

The present disclosure relates to systems and methods for surfacing prerecorded gameplay video for in-game player assistance.

BACKGROUND

Description of the Related Art

An expanding area of the gaming industry is that of sharing gameplay video and spectating gameplay. Users are now able to record and share their gameplay through websites, social media, etc. Furthermore, users may live-stream their gameplay, so that others can view their gameplay as it occurs in substantial real-time.

Another current trend in the gaming industry is a move towards cloud gaming. Cloud gaming provides advantages to the end user by enabling remote execution of a video game in a data center where the resources for the video game can be guaranteed. The video generated by the remotely executed video game is streamed to the user's equipment, and inputs from the user are sent back to the data center. This frees the end user from the need to own specific hardware in order to execute the game itself. Rather, the end user need only possess sufficient hardware to stream the gameplay, and may still enjoy a high quality gaming experience. Furthermore, in theory, cloud gaming enables gaming from any location where network connectivity is available.

A continuing trend in the video game industry is the increased sophistication of graphics and the availability of computing resources to meet the demands of modern game engines. As video games evolve, their resolutions and frame rates continue to increase, enabling rendering of very realistic and detailed virtual environments. Additionally, the popularity of cloud gaming continues to grow, and the shift to cloud executed video games enables even greater access to high quality gaming experiences.

It is within this context that embodiments of the disclosure arise.

SUMMARY OF THE DISCLOSURE

Implementations of the present disclosure provide systems and methods for surfacing prerecorded gameplay video for in-game player assistance.

In some implementations, a method is provided, including the following operations: receiving, over a network from a plurality of first client devices that execute respective sessions of a video game, videos generated from the respective sessions of the video game at the first client devices; for each video, receiving, over the network from one of the first client devices, location metadata that identifies spatial locations in a virtual environment of the video game at which gameplay depicted by the video occurs, the location metadata being correlated to video frames of the video and identifying the spatial location of the gameplay depicted by a given video frame; during a session of the video game executed by a second client device, receiving, over the network, a current spatial location in the virtual environment of gameplay occurring in the session; using the current spatial location to select one or more of the videos; presenting, over the network, the selected videos at the second client device.

In some implementations, receiving the location metadata for a given video occurs substantially simultaneously with the receiving of the given video over the network.

In some implementations, the given video and the location metadata for the given video being synchronously streamed over the network from the first client device that generates the given video.

In some implementations, the current spatial location in the virtual environment is defined by current spatial coordinates of a virtual character or a virtual object in the virtual environment.

In some implementations, the location metadata that identifies spatial locations in the virtual environment is defined by spatial coordinates over time of a virtual character or a virtual object in the virtual environment.

In some implementations, the location metadata identifies a chapter, level, or scene of the video game.

In some implementations, using the current location to select one or more of the videos includes identifying one or more of the videos having location metadata identifying a spatial location proximate to the current spatial location.

In some implementations, presenting the selected videos includes displaying a preview image for each of the selected videos.

In some implementations, the method further includes: receiving a request for playback of one of the selected videos; responsive to the request for playback, streaming the one of the selected videos to the second client device.

In some implementations, a non-transitory computer readable medium is provided having program instructions embodied thereon that, when executed by at least one computing device, cause said at least one computing device to perform a method comprising the following operations: receiving, over a network from a plurality of first client devices that execute respective sessions of a video game, videos generated from the respective sessions of the video game at the first client devices; for each video, receiving, over the network from one of the first client devices, location metadata that identifies spatial locations in a virtual environment of the video game at which gameplay depicted by the video occurs, the location metadata being correlated to video frames of the video and identifying the spatial location of the gameplay depicted by a given video frame; during a session of the video game executed by a second client device, receiving, over the network, a current spatial location in the virtual environment of gameplay occurring in the session; using the current spatial location to select one or more of the videos; presenting, over the network, the selected videos at the second client device.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure, together with further advantages thereof, may best be understood by reference to the following description taken in conjunction with the accompanying drawings.

FIG. 7 conceptually illustrates using the controller input time series in a replay video, in accordance with implementations of the disclosure.

DETAILED DESCRIPTION

Figure 1:
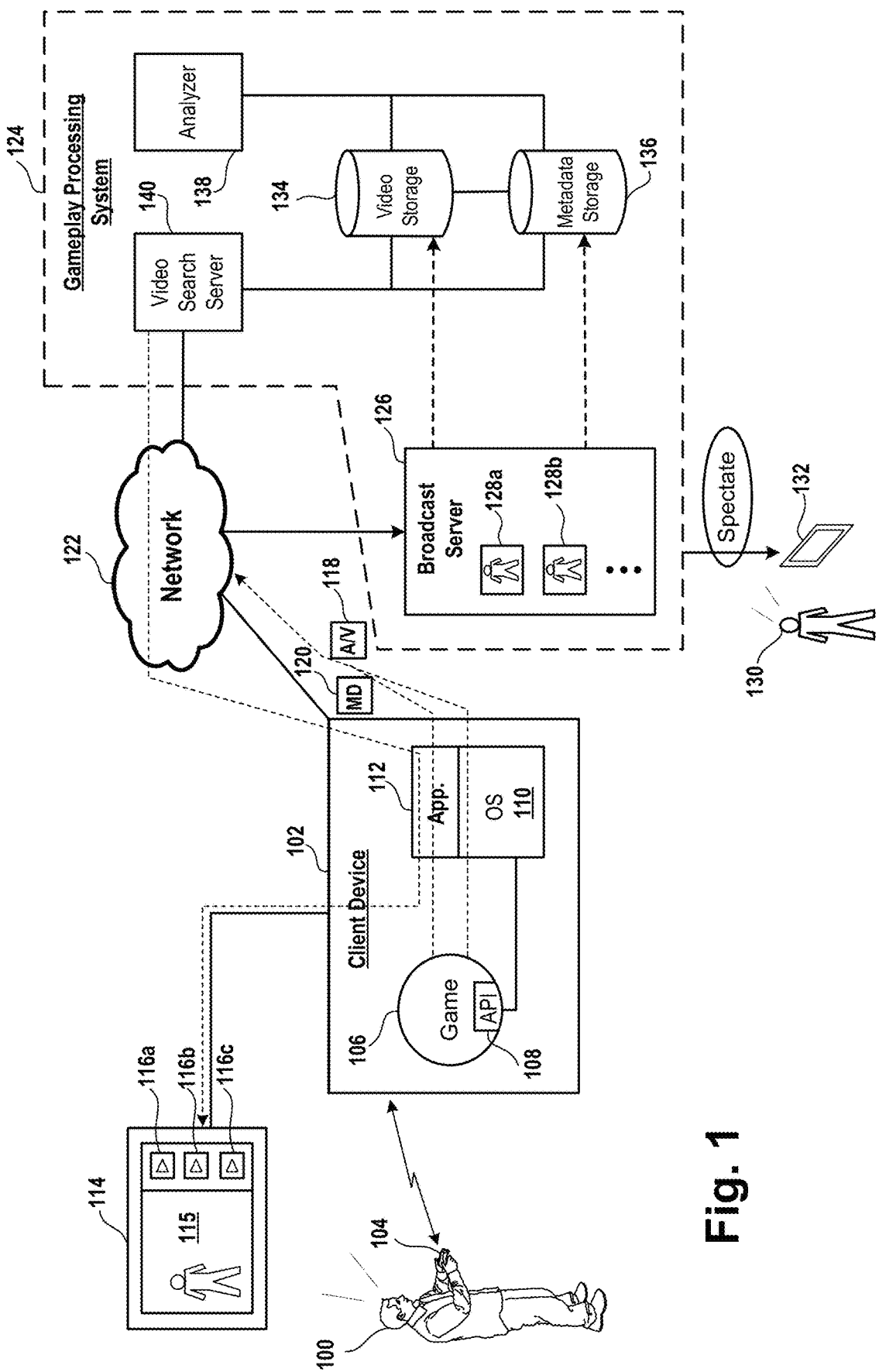
FIG. 1 conceptually illustrates a system for broadcasting gameplay video of a video game and storing and analyzing said gameplay video for playback in conjunction with gameplay of the video game, in accordance with implementations of the disclosure.

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

Currently, players may record and share their gameplay videos, or broadcast such videos. Streaming services enable users to live stream their gameplay video over the Internet, with spectators able to access and spectate other users' gameplay video through websites, gaming platforms, mobile apps, or other types of content platforms. However, such videos do not provide any information regarding what level, chapter, or part of the game is being played. These videos could be helpful to others as providing a run-through or tutorial about the game. However, with existing systems, information needed to catalog such videos would need to be manually provided in some way. That is, someone would need to manually watch the videos and determine where in the game the user is playing. And even so, more specific information such as the exact coordinate location of a given player in a virtual environment would still not be known.

In fact, a current problem for game developers or publishers is that they would like to provide help videos to users in an efficient manner, but currently are unable to do so. To the extent that help videos are generated, they are generated through very manual processes that are resource intensive to produce. Further, they are only generated for areas of the game that they see fit to cover, and may not cover areas of the game that many users actually struggle with playing. They are also limited to the specific help videos they choose to produce, and thus will not cover many different styles or approaches to the gameplay that the broader body of users will generate.

To address such issues, implementations of the present disclosure provide systems and methods wherein relevant metadata is added to the gameplay broadcast stream, making it possible to intelligently collect the various gameplay videos using knowledge of the gameplay, e.g. which chapter, level, (x,y,z) coordinates, etc. Using such information, a system can intelligently catalog gameplay videos, and create a map or run through of a given level, for example. If a player is having trouble in a certain area of the game, then the system can direct the player to videos from the same area of the game which were recorded previously.

In this manner, data is collected on all of the run throughs that are broadcast or shared, and the availability of game assistance doesn't depend on whether the game content creators flagged a particular area to make additional documentation such as a help video. If someone played the game in a certain area, then there would be video content to watch on that area.

FIG. 1 conceptually illustrates a system for broadcasting gameplay video of a video game and storing and analyzing said gameplay video for playback in conjunction with gameplay of the video game, in accordance with implementations of the disclosure. In the illustrative implementation, a user 100 engages in gameplay of a video game 106 that is executed by a client device 102. It will be appreciated that the client device 102 can be any kind of computing device capable of executing a video game for gameplay, such as a gaming console, personal computer, laptop computer, tablet, cell phone, mobile device, etc. Gameplay video 115 generated from the executing video game 106 is rendered by the client device 102 for presentation on a display 114. In some implementations, the display 114 is a separate device from the client device, such as a television, monitor, head-mounted display, etc. In some implementations, the display 114 is integrated with the client device 102. It will be appreciated that the display 114 can employ any of various electronic display technologies such as LCD, LED, OLED, AMOLED, QLED, plasma, etc.

For ease of description in the present disclosure, unless otherwise noted or apparent from the description, "video" or "gameplay video" in the present disclosure can include or refer to both moving image data and audio data which are used to depict the imagery and sound of the video game.

In some implementations, the gameplay video 115 is streamed or broadcast (live) over a network 122 for spectating by other users. In the illustrative implementation, a video stream 118 that encodes the gameplay video is transmitted from the client device 102 over the network 122 to a gameplay processing system 124, and more specifically to a broadcast server 126 included in the gameplay processing system 124. The broadcast server 126 may further process the video stream 118 and broadcast the live gameplay video 128a for spectating by other users such as user 130, who may spectate the gameplay video through a device 132. In some implementations, the broadcast server 126 provides a website through which gameplay video can be live streamed and accessed by spectators. In some implementations, the broadcast server 126 is configured to provide such gameplay videos through specialized interfaces such as through a gaming platform of a dedicated gaming console, an app on a mobile device, a video sharing site, a social network service, etc.

The broadcast server 126 provides access for spectators to spectate other gameplay videos such as gameplay video 128b, which can be live streamed or previously recorded gameplay video. Additionally, the broadcast server 126 stores the gameplay videos to a video storage 134.

In accordance with implementations of the present disclosure, metadata 120 from the video game 106 is also streamed along with the video stream 118. The metadata 120 is correlated (or linked, or synchronized in some implementations) to the time series or video frames of the gameplay video that is defined by the video stream 118. The metadata 120 includes information about the gameplay occurring in the gameplay video, such as the level or chapter being played, the spatial location of the gameplay such as the spatial location of a given virtual object or character, events or actions in the gameplay, etc. It will be appreciated that the correlation of the metadata to the time series of gameplay video enables the metadata to be used to understand what is occurring and where (temporally or spatially) events are occurring at each specific moment in the gameplay video.

In some implementations, the metadata is accessed through an API 108 of the video game 106. In some implementations, the metadata is obtained by an application 112 executing over an operating system 110 of the client device 102. In some implementations, the application 112 is a service of the operating system 110. In some implementations, the metadata 120 is streamed over a separate data channel to the gameplay processing system 124. Whereas in other implementations, the metadata is embedded in the video stream itself, as certain video formats provide additional fields which can be enabled and utilized for transmission of the metadata.

As noted, the broadcast server 126 is included as part of the gameplay processing system 124. The video stream and the metadata are transmitted over the network 122 to the gameplay processing system 124, and in some implementations, more specifically to the broadcast server 126. The metadata 120 is stored to a metadata storage 136.

An analyzer 138 is configured to analyze the gameplay videos and their corresponding metadata. In so doing, the analyzer 138 may generate additional metadata for a given gameplay video that may further characterize the game play video or provide additional information about the gameplay video, which may in turn be used to enable filtering and searching of the gameplay video based on such characteristics or information. In some implementations, the analyzer 138 can employ a machine learning or artificial intelligence process to analyze gameplay videos and their associated metadata, to enable deeper understanding of what is happening in a given gameplay video.

A video search server 140 is configured to expose a search capability to enable viewers/players to see the stored gameplay videos. A search for gameplay videos may filter or rank the gameplay videos based on a variety of factors, e.g. popularity, number of views, subscribers, author's relationship to the viewer in a social network/graph (e.g. prioritizing videos from the user's friends list on the social network), speed of playthrough, etc.

In some implementations, the gameplay videos are searched and surfaced for the purpose of providing help or assistance to a user playing the video game. For example, the application 112 of the client device 102 can be configured to access the video search server 140 in order to obtain gameplay videos which are relevant to the user's current gameplay of the video game 106. One example of this is to provide gameplay videos which feature gameplay from the same or a similar location as that which the user is currently located. By way of example without limitation, the application 112 may obtain the current location of the user in the video game (e.g. the location of a virtual character controlled by the user in the virtual environment of the video game), and use this location to access the video search server 142 to search for videos that show gameplay from the same location or in proximity to the user's location. In this manner, the system can serve content to the user 100 that is localized to where the user is at in the video game.

It will be appreciated that while a location in the video game can be understood to be a spatial location in a virtual environment of the video game, for purposes of the present disclosure, the location in the video game can also be a temporal location or progress or storyline location within the context of the video game. For example, a video game may require a series of tasks or accomplishments to be performed for the user to progress through the video game. Thus the accomplishment of these tasks can be used to define amount of progress within the video game achieved by the user. Such progress can also be correlated to specifically defined levels, chapters, scenes, or other segments within the storyline of the video game. It will be appreciated that any of these kinds of progress indicators can be used to define the location of the user in the video game, which as noted above can be used to serve content localized to the user.

In some implementations, the results of the video search can be surfaced to the user in-game. For example, in some implementations the user 100 can pause their gameplay and request related gameplay videos to view, possibly to help the user in their gameplay, or simply to enable the user to view alternative run throughs by other users playing in the same or a similar location in the game. In the illustrative implementation, a search is performed as described above, and the resulting related gameplay videos 116a, 116b, and 116c, are shown on screen. In some implementations, the application 112 is configured to render an overlay (e.g. dashboard) on to the game screen so as to present the gameplay video results, which in some implementations can include preview images of the resulting videos. The user 100 may select one of the videos 116a, 116b, or 116c (e.g. select the preview image of the video) to initiate playback of the selected video.

While execution of the video game has been described as occurring at the client device 102, it will be appreciated that in other implementations the video game may be cloud executed. That is, the video game can be executed by a cloud gaming server/computer, with the gameplay being streamed over the network to the client device. Accordingly, other functionality of the client device as described above can be cloud executed, such as that of the application 112.

Figure 2:
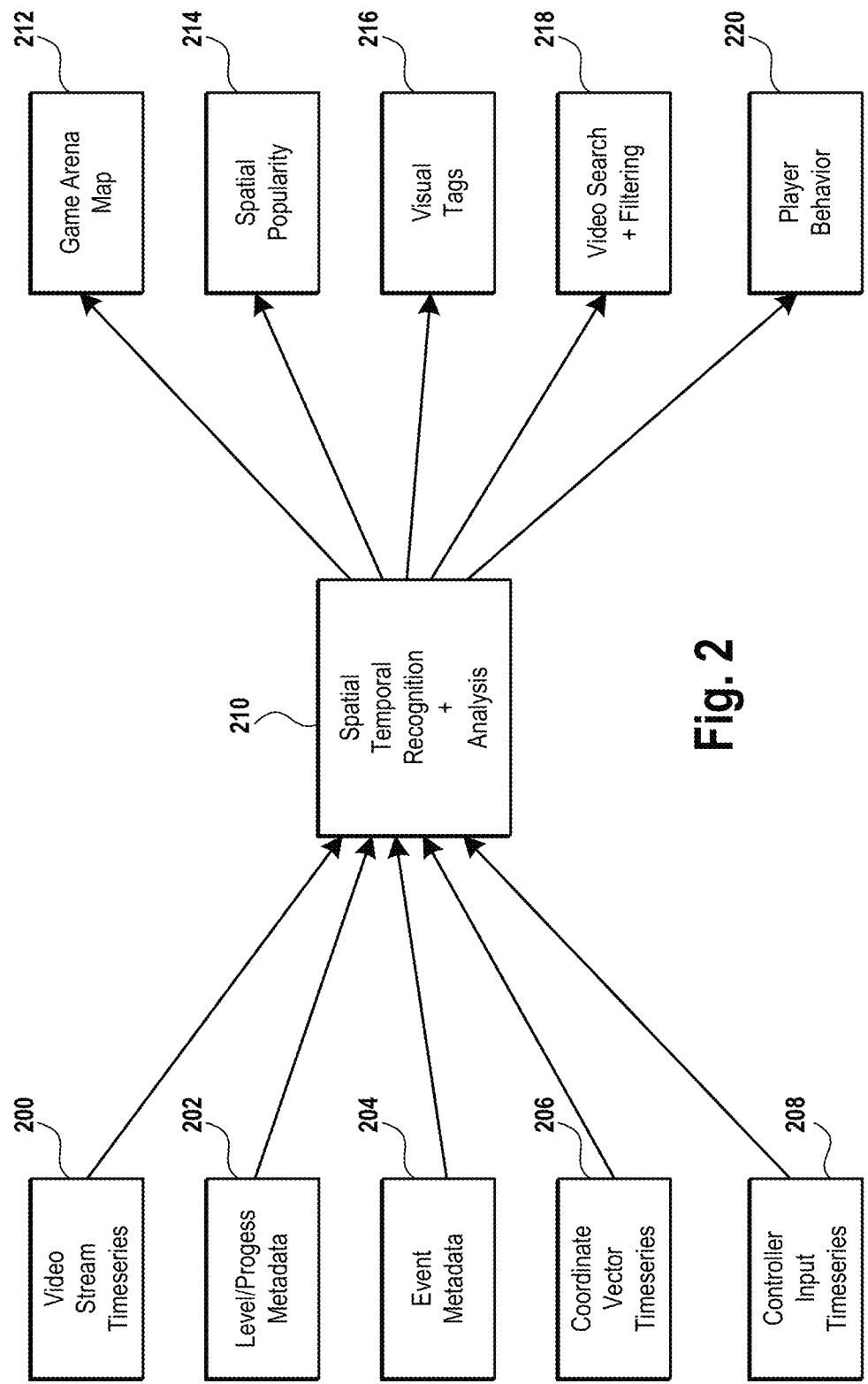
FIG. 2 conceptually illustrates a process for using gameplay video streams and associated metadata to generate useful information and provide novel features to players and game developers, in accordance with implementations of the disclosure.

FIG. 2 conceptually illustrates a process for using gameplay video streams and associated metadata to generate useful information and provide novel features to players and game developers, in accordance with implementations of the disclosure. Shown at left in the illustrative implementation are various pieces of information generated from an executing video game, including the video stream time series 200, progress metadata 202, event metadata 204, coordinate vector time series 206, and controller input time series 208. The video stream time series 200 consists of the streamed gameplay videos having information identifying the timing and sequence of video frames of the gameplay videos, which enables metadata or other information related to the gameplay videos to be correlated to specific time points or video frames in the gameplay videos. In some implementations, the video stream time series 200 includes a time code or sequence numbering of the video frames in a given gameplay video.

The progress metadata 202 includes information that identifies the amount of progress in the video game that has been achieved at a given moment of the gameplay shown by a given gameplay video. By way of example without limitation, the progress metadata 202 can include information such as the level, chapter, scene, section, segment, or other identifier of which portion in the storyline of the video game is being played. In some implementations the progress metadata 202 can include data from game save snapshots such as from auto-saves which occur during gameplay. In some implementations the progress metadata 202 can include other progress indicators such as life or death results. The event data 204 includes information that identifies specific events occurring during the gameplay. It will be appreciated that such events can include any of a variety of occurrences or actions that may occur in the context of the video game, such as various tasks, accomplishments, achievements, acquiring virtual objects, enemy kills, player deaths, skill developments, moves, combos, etc.

The coordinate vector time series 206 includes information identifying the spatial location and direction of the user in a virtual environment of the video game from moment to moment during the gameplay. This can be defined by 3D coordinates in a three-dimensional virtual space, by way of example, as well as a vector direction in the virtual space, for example of a virtual character or object that is controlled by the user. The vector direction can identify a direction that the virtual character or object is facing or moving in the virtual space, and may further identify a rate or speed of such movement. The controller input time series 208 includes information identifying controller inputs or commands fed to the video game, which are generated through user interactivity during gameplay of the video game.

It will be appreciated that as each of the video stream time series 200, progress metadata 202, event metadata 204, coordinate vector time series 206, and controller input time series 208 are correlated to the timing and/or video frames of the gameplay video, then this information can be utilized to determine and analyze what is happening in the gameplay video at each frame or moment of gameplay. An analysis process 210 is configured to analyze the foregoing information to determine various information and provide various features as presently described.

In some implementations the analysis process 210 includes a spatial temporal (or spatiotemporal) recognition process that constructs a game arena map using the collected data. For example, the spatial temporal recognition process can use the video stream time series 200 and the coordinate vector time series 206 to collage the game world map, thereby building an in-game view of game arenas. This can be especially useful as spatial recognition can be utilized to reconstruct legacy or third-party game worlds without a priori knowledge of the game code. In some implementations the spatial temporal recognition process maps specific views of the game's virtual environment to specific locations and view directions (or perspectives) within said virtual environment. In some implementations, the spatial temporal recognition process is capable of generating a 3D game arena map, for example utilizing photogrammetry-type techniques or other types of 3D mapping technology based on provided views of a given 3D space. That is, the process can determine the 3D geometry of the video game virtual environment by analyzing the content of image frames of gameplay videos and using the coordinate vector time series which identifies the perspectives from which the image frames were rendered.

Furthermore, the analysis process 210 can be configured to analyze player behaviour using the provided information. By way of example without limitation, the analysis process can determine the spatial popularity 214 of locations within the game's virtual environment. The analysis process 210 can analyze gameplay videos from many users over time, and determine and track the amount of users that visit different areas of the virtual environment. In this manner, the popularity of specific game areas can be determined. Such information can be valuable for game player behavioral analysis, and to focus game-related efforts on popular areas. For example, popular areas could be targeted for in-game ad placement, to focus development efforts (e.g. artist time), for broadcasting, etc. Similarly, less popular areas of the game could be identified and targeted for improvement so as to increase their popularity.

In some implementations, the analysis process 210 can be configured to generate visual tags 216 for the game arena map. By way of example, the visual tags can be thumbnail images or even gameplay video clips, generated from the gameplay videos, which are associated to specific locations within the game arena map. In this way, a user viewing the game arena map can see images from specific areas of the game.

As has been described, in some implementations the analysis process 210 can further enable gameplay video search and filtering (ref. 218), for example to provide run through videos to assist a player.

Furthermore, the analysis process 210 can be configured to analyze and determine player behavior 220. For example, a given gameplay video can be analyzed to determine the skill level of the player that generates the gameplay video. As the skill levels of players can be associated with their gameplay videos, then skill level can be utilized for purposes of filtering gameplay videos for other users. For example, the skill level of a currently playing user can be determined, and then videos from players of a similar skill level can be provided to the user. As another example of player behavior, specific player actions at specific temporal or spatial locations can be identified. Actions leading to successful outcomes versus actions leading to unsuccessful outcomes can be identified. Such information can be used to serve hints to a player.

Figure 3:
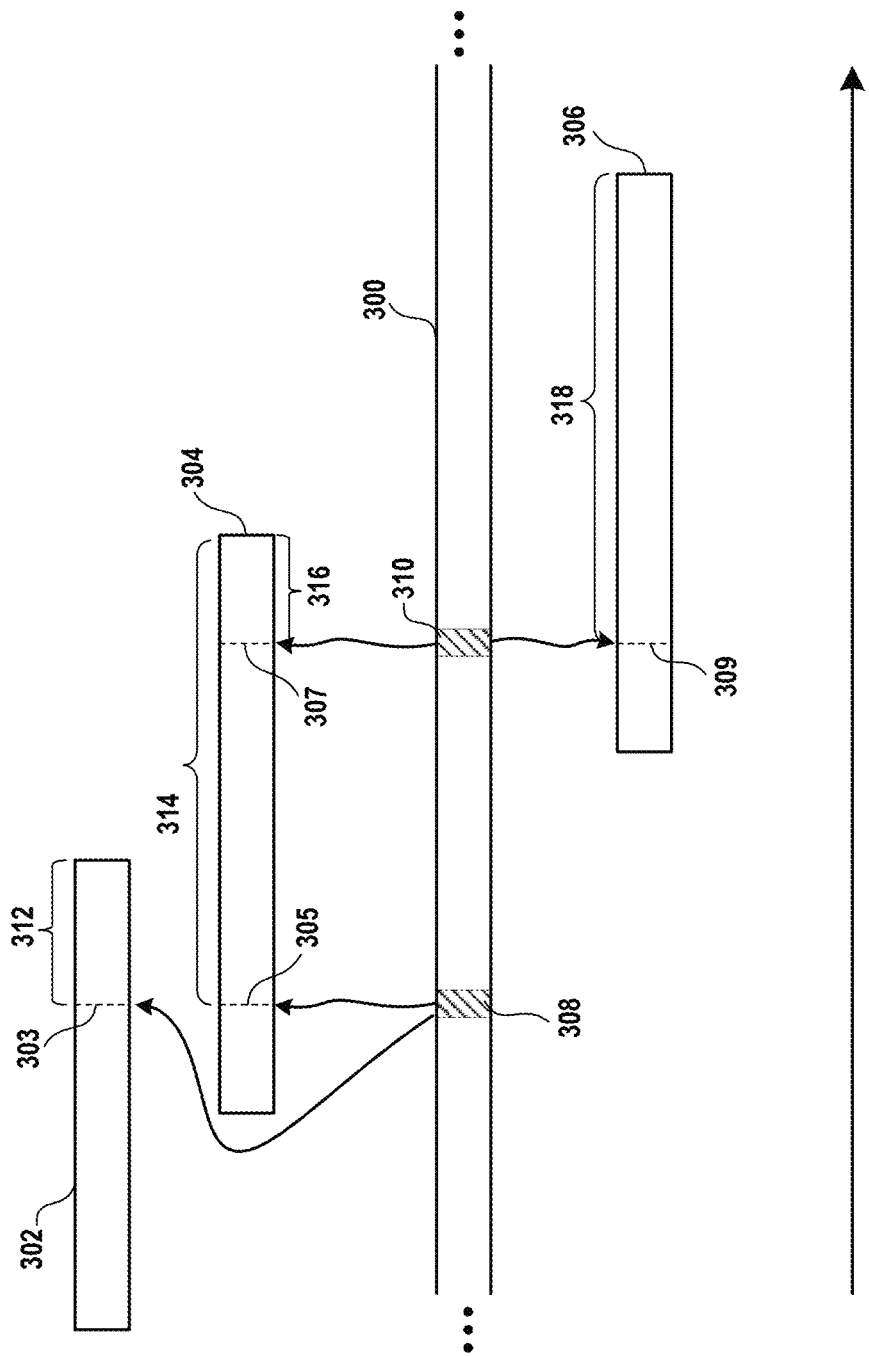
FIG. 3 conceptually illustrates various gameplay videos correlated with a user's current gameplay, in accordance with implementations of the disclosure.

FIG. 3 conceptually illustrates various gameplay videos correlated with a user's current gameplay, in accordance with implementations of the disclosure. The bar shown at reference 300 conceptually illustrates the user's progress during gameplay of a video game. Moving from left to right along the bar represents progress by the user in the context of the gameplay of the video game. It will be appreciated that progress can involve temporal traversal of a storyline, spatial traversal of a virtual environment, and/or other types of traversals which define progress in the context of the video game. Various previously recorded gameplay videos 302, 304, and 306 are also conceptually shown and represented as bars. It will be appreciated that vertically aligned portions of the user's gameplay 300 and the various gameplay videos 302, 304, and 306 indicates a similar or the same state of progress.

Thus in the illustrated implementation, when the user's gameplay has advanced to a given state of progress 308, then this corresponds to a timepoint 303 in the gameplay video 302 as well as a timepoint 305 in the gameplay video 304 which are time points in the respective gameplay videos at which an equivalent state of progress or similar state of progress is reached. For example, the state of progress 308 may be defined by a spatial location in a virtual environment, in which case the time points 303 and 305 of the gameplay videos 302 and 304 respectively represent time points in the gameplay videos at which the gameplay was taking place at the same spatial location. Also by way of example, the state of progress 308 may be defined by a temporal location or level of achievement in a storyline context of the video game, in which case the time points 303 and 305 of the gameplay videos 302 and 304 respectively represent time points in the gameplay videos at which the gameplay attained the same or similar temporal location or level of achievement within the storyline context.

As noted, the system may offer such gameplay videos for the purpose of providing help videos to assist the user in their gameplay. Accordingly, when the videos are provided, playback can be configured to initiate at the timepoints corresponding to the same or similar state of progress as that of the user. In this case the playback would initiate at timepoint 303 in the gameplay video 302 or at timepoint 305 in the gameplay video at 304, thereby skipping ahead in the videos to the relevant portion for the user. In some implementations, playback can we configure to initiate at a timepoint that is somewhat before that matching the progress state of the user (e.g. a predefined amount such as a few seconds before), so as to provide the user with an earlier context when viewing the video.

As described, help videos can be searched and filtered based on their correspondence to the current progress of the user. Thus in the illustrated implementation, when the user's gameplay 300 is at the state of progress 308, the gameplay videos 302 and 304 may be offered as help videos whereas the gameplay video 306, which does not overlap in terms of progress with the state of progress 308, is not offered as a help video. However, when the user's gameplay 300 has advanced to a state of progress 310, then the gameplay video 306 can be offered as a help video whereas the gameplay video 302 will not be offered.

An additional aspect which can be utilized to search and filter gameplay videos for presentation to the user, is that of the remaining amount of time in the gameplay video when initiated at the relevant timepoint. With continued reference to the illustrated implementation of FIG. 3, when the user's gameplay 300 is at the state of progress 308, if playback of gameplay video 302 is initiated at timepoint 303 then there is an amount 312 (of time or progress) remaining in the gameplay video 302. Whereas if playback of gameplay video 304 is initiated at timepoint 305, then there is an amount 314 remaining in the gameplay video 304. In some implementations, the amount of time remaining when gameplay is initiated at the relevant timepoint can be used to filter or prioritize gameplay videos for presentation to the user. Thus by way of example, the gameplay video 304 could be prioritized over the gameplay video 302 as a help video since the amount 314 remaining in gameplay video 304 is greater than the amount 312 remaining in gameplay video 302, thus enabling the user to enjoy a longer playback if the gameplay video 304 is selected. In some implementations, if the amount remaining in a gameplay video is less than a predefined amount, then such a gameplay video is not surfaced or presented to the user, as viewing a video portion of too short a duration is not likely to be helpful to the user.

Similarly, when the gameplay of the user has advanced to a state of progress 310, then if playback of the gameplay video 304 is initiated at timepoint 307, then there is a remaining amount 316 of the gameplay video to be viewed. Whereas if playback of gameplay video 306 is initiated at timepoint 309, then there is an amount 318 remaining to be viewed, which is significantly greater than the amount 316. Accordingly in some implementations, the gameplay video 306 is prioritized for viewing over the gameplay video 304.

Figure 4:
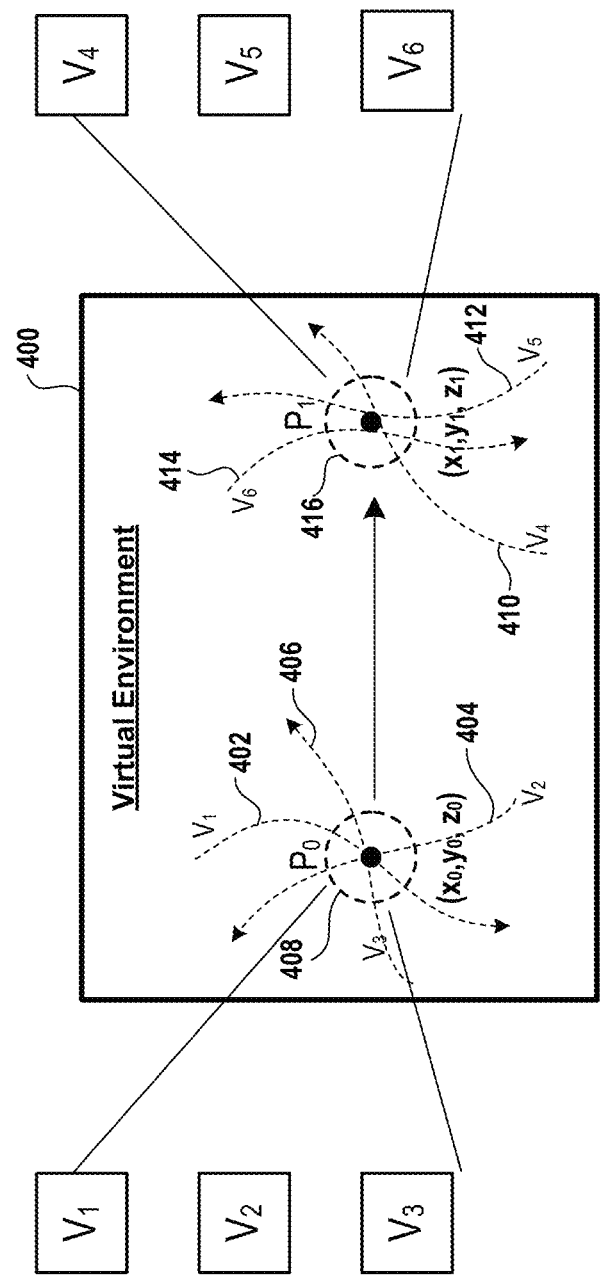
FIG. 4 conceptually illustrates various intersecting paths of gameplay videos in a virtual environment, in accordance with implementations of the disclosure.

FIG. 4 conceptually illustrates various intersecting paths of gameplay videos in a virtual environment, in accordance with implementations of the disclosure. During the course of gameplay of a video game, a user may be located in a virtual environment 400 at a position $P_0$. In some implementations, the position $P_0$ is defined by a three-dimensional spatial location in the virtual environment 400, which may further be identified by three dimensional coordinates $(x_0, y_0, z_0)$. When located at the position P0, previously recorded gameplay videos $V_1$, $V_2$, and $V_3$ may be surfaced to the user as has been described. These gameplay videos have been selected from the larger body of existing recorded gameplay videos as they are ones in which gameplay occurred at the same or a proximate location to the position $P_0$ at some point within the videos.

It will be appreciated that players of the video game may take different paths through the virtual environment 400, and accordingly different gameplay videos will show different paths traversed through the virtual environment. As shown in the illustrative implementation, the gameplay which was captured by the gameplay video $V_1$ traversed a path 402 in the virtual environment 400. Likewise, the gameplay captured by the gameplay video $V_2$ traversed a path 404, and the gameplay captured by the game play video $V_3$ traversed a path 406. These gameplay videos represent gameplay that intersects at the position P0, or that intersects a region 408 proximate to the position $P_0$ in the virtual environment 400. The gameplay videos $V_1$, $V_2$, and $V_3$ have been filtered from existing gameplay videos on the basis of their having gameplay that intersects the position $P_0$ or the proximate region 408.

When the user moves to a new position $P_1$, having 3D coordinates $(x_1, y_1, z_1)$, then a different set of gameplay videos is presented to the user based on the user's updated position. In the illustrative implementation, gameplay videos $V_4$, $V_5$, and $V_6$ are selected for presentation to the user. The game play captured by the game play videos $V_4$, $V_5$, and $V_6$, occurs along paths 410, 412, and 414, respectively, traversed in the virtual environment 400. These paths intersect the position $P_1$ or a region 416 in the vicinity of or proximate to the position $P_1$.

In the presently described implementation it will be appreciated that gameplay videos are filtered and selected for presentation to the user based on the positions and paths traversed by the game play captured within the gameplay videos. Such filtering and selection is made possible through the transmission of metadata describing the locations at which gameplay occurs from moment to moment in the gameplay videos, as has been described. Thus, as the user moves to various locations within the virtual environment 400, the gameplay videos presented to the user are dynamically filtered/shuffled and updated based on the user's current location. This can provide a dynamic help/hint system which utilizes existing gameplay videos supplied by users, and makes them available to players in a manner relevant to their current gameplay.

It will be noted that the gameplay videos are not being provided specifically for the purpose of providing a help/assistance video. However, by mapping such replays of others to their corresponding spatial/temporal locations of the video game, they can be used to demonstrate others' gameplay at a similar point of progress in the video game to provide assistance.

In some implementations, gameplay videos can be spliced together across many videos to, for example, create a level walk through from content generated by users that were playing the game. While the users were simply playing the game, by collecting the metadata correlated to the gameplay videos, it then becomes possible to determine what is being shown and what is happening in a given gameplay video, and intelligently provide access to its contents.

Figure 5:
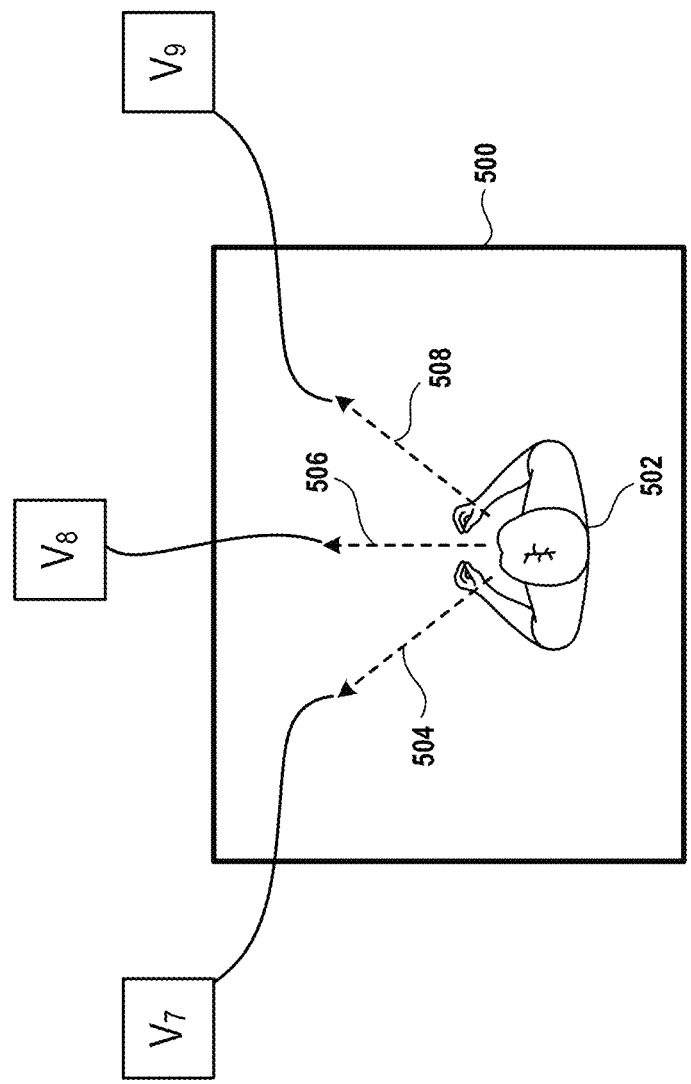
FIG. 5 conceptually illustrates a user facing different directions in a virtual environment, and different gameplay videos being presented as a result, in accordance with implementations of the disclosure.

FIG. 5 conceptually illustrates a user facing different directions in a virtual environment, and different gameplay videos being presented as a result, in accordance with implementations of the disclosure. In the illustrative implementation, the user's view of a virtual environment 500 of a video game is represented by the view of a virtual character 502 that is controlled by the user. In some implementations, as the user looks in different directions, different gameplay videos may be surfaced. For example, when the user is facing a direction 504, a gameplay video $V_7$ is suggested to the user, whereas when the user is facing a direction 506, a gameplay video $V_8$ is suggested, and whereas when the user is facing a direction 508, a gameplay video $V_9$ is suggested. These different gameplay videos can represent different paths that works reversed in the virtual environment 500 of the video game. Thus, as the user looks in a given direction, gameplay videos are presented which show gameplay of players that took a path in that direction in the virtual environment.

In some implementations, when faced with multiple options/paths in the user's view, the system may present videos corresponding to each of the options. By way of example, the user could be faced with different hallways to choose from, the system could pull up videos where players took each of the hallways. As noted, in some implementations, the different videos are presented depending upon which direction the user is facing, and thus different gameplay videos are shown depending on which one of the hallways the user is facing.

Figure 6:
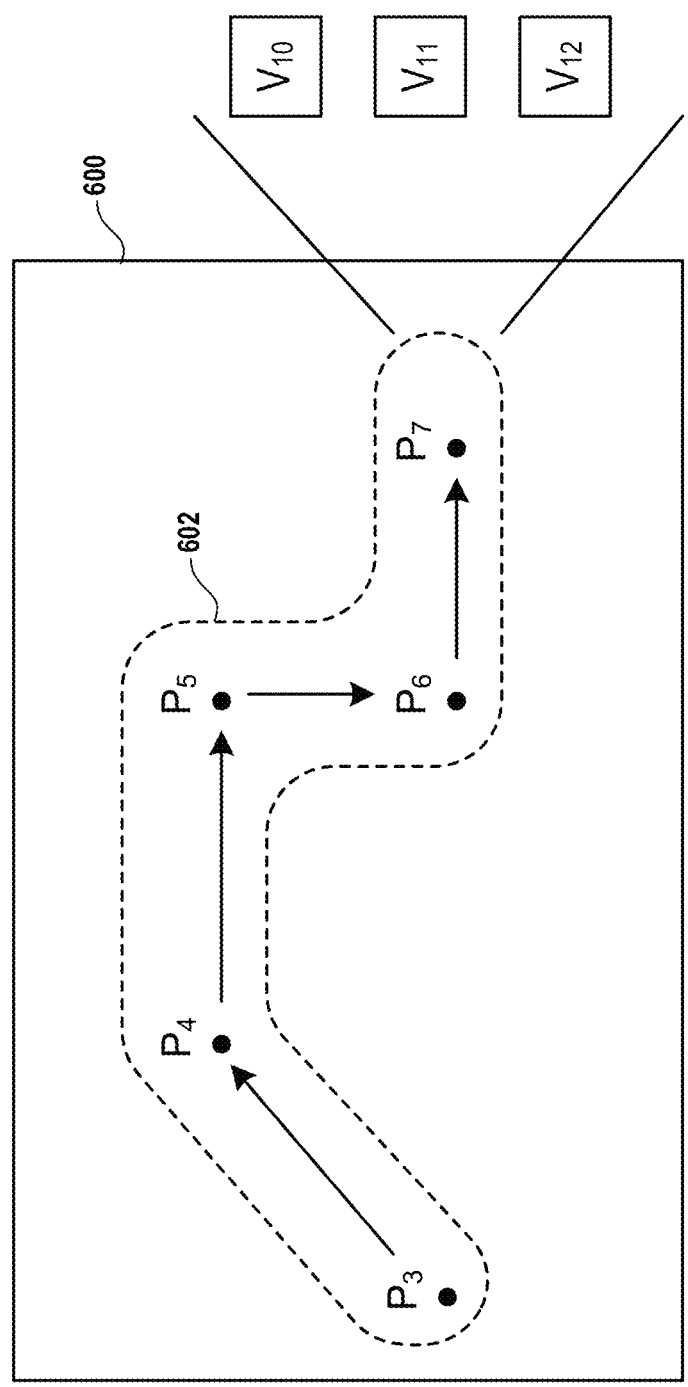
FIG. 6 conceptually illustrates selection of gameplay videos based on the user's gameplay path, in accordance with implementations of the disclosure.

FIG. 6 conceptually illustrates selection of gameplay videos based on the user's gameplay path, in accordance with implementations of the disclosure. In The illustrated implementation, a user's gameplay traverses a virtual environment 600, moving from location $P_3$ to $P_4$ to $P_5$ to $P_6$ to $P_7$. It will be appreciated that the locations can be spatial locations in a virtual space in some implementations. In other implementations, the locations can be logical locations within the context of the video game, representing choices or other types of user-controlled actions in directing gameplay events. As the user traverses the virtual environment 600 from location $P_3$ to location $P_7$, the user's gameplay defines a path 602.

In some implementations, gameplay videos can be filtered or selected for the user based on the path traversed by the user in the video game. More specifically, gameplay videos in which the gameplay path taken by the prior player is similar to that of the current path taken by the current user, can be prioritized or selected for presentation to the user. In the illustrated implementation, when the user has reached the location $P_7$, videos $V_{10}$, $V_{11}$, and $V_{12}$ have been selected from the available gameplay videos based at least in part on the paths of gameplay traversed within those gameplay videos. The system can thus show videos of other users who followed a similar path or traversed the same or similar locations. In this manner, the system can show gameplay of other users that play closer to the style of the current user.

In various implementations the concept of finding gameplay videos from players exhibiting a similar style to that of a currently playing user can be extended to encompass any aspect which can be determined from metadata correlated to the gameplay videos. By way of example without limitation, such aspects of gameplay could include the sequence and kinds of actions taken by a player, the sequence of events, types of moves and patterns of moves executed, level of skill, controller inputs, etc. In some implementations, a degree of similarity can be determined between the current user's gameplay and that of a prior users' gameplay videos, and the degree of similarity can be utilized to select or filter the gameplay videos for presentation to the current user. While filtering gameplay videos to show other players with a similar style has been discussed, it may also be beneficial to prioritize videos of players exhibiting a different style than the current user, so as to show the current user other styles of play and help them expand their skill level by attempting different actions or styles of play.

FIG. 7 conceptually illustrates using the controller input time series in a replay video, in accordance with implementations of the disclosure. In the illustrative implementation, the player 700 operates a controller device 702 during gameplay of a video game that is rendered as shown at reference 704. As noted above, such gameplay video can be stored along with corresponding metadata. In some implementations, the controller inputs generated from the controller device 702 (e.g. button presses, joystick maneuvers, etc.) can constitute part of the corresponding metadata that is mapped to the gameplay video.

When the gameplay video is presented to another user, as shown at reference 706, the gameplay video can be further configured to include a section 708 that displays the original player's 700 controller inputs, such as an overlay. That is, indicators of the inputs produced by the player 700 operation of the controller device 702 can be displayed in the section 708 so that the spectating user, such as a current player using the gameplay video 706 as a help video, can also see the specific controller inputs which were entered by the player 700. In this manner, the spectating user is able to not only see the actions taking place in the gameplay video 706, but also see the controller inputs which produced those actions. In some implementations, the display of the controller inputs in the section 708 is configured to scroll up or down or side-to-side, showing the original sequence of controller inputs in synchronization with the playback of the gameplay video.

In some implementations, player input can be used for filtering. For example, it may not be helpful to show a low skill player video of a high skill player because the low skill player might not be able to perform the same types of inputs/maneuvers. Thus, player inputs associated with the gameplay videos could be used to filter the gameplay videos. In some implementations, a machine learning process can be utilized to analyze player inputs and determine user skill level. User input can thus be used to rank the skill level of player videos, and the same can be performed for the active user. Using this information, then appropriate skill level videos can be fed to the user.

In some implementations, other types of information can be provided in metadata, such as level/chapter, success indicators, deaths, checkpoints, etc. which can be used to prioritize gameplay videos. For example, a gameplay video showing a player dying repeatedly in a relatively short timeframe is probably less useful to spectate than more successful videos where the player advances without dying as much. Thus, the number of player deaths in a given amount of time could be used as a factor to prioritize videos.

In some implementations, machine learning could be applied to evaluate what successful players do or have. For example, the system could determine that one should have the gold key based on analyzing the various videos and their metadata. And these learnings could be displayed as hints to the user, e.g. displaying a message indicating that most/all successful players at this point have the gold key before proceeding.

In some implementations, a developer could provide a master timeline of hints that apply to any video, so that such hints are displayed when the user watches a given video.

In some implementations, gameplay videos could be displayed on a separate device than that through which current gameplay is occurring, such as through a companion app on a mobile device or other device.

Implementations of the present disclosure can be included as part of a game engine. Broadly speaking, a game engine is a software-development framework providing features that enable efficient development of video games. A game engine can include a software library with reusable modules to handle various aspects of game functionality, including by way of example without limitation, graphics rendering (e.g. including vertex processing, polygon processing, shading, lighting, texturing, etc.), sound, physics (including collision handling), animation, scripting, artificial intelligence, networking, streaming, memory management, threading, localization support, scene graph, cinematics, etc.

Game engines can be optimized for different hardware platforms, such as game consoles, mobile devices, personal computers, etc. By way of example without limitation, a game engine may optimize memory use depending upon the platform (e.g. how to prioritize various tasks in the graphics pipeline, etc.). In some implementations, the hardware may be a bladed version of some specific processing entity, such as a game console. Thus, a user may be assigned to a specific blade, which gives the same hardware that a console game has been optimized for.

It will be appreciated that there can also be game server logic to provide streaming and/or other services (packetizing, encoding, quality of service (QOS) monitoring, bandwidth testing, access to social network/friends, etc.)

In some implementations, a cloud infrastructure may run a hypervisor, which abstracts the hardware and provides a virtual machine framework, upon which an operating system (OS) can be loaded. Thus, a stack may include the application/video game, running on an OS, which is loaded on a virtual machine (VM) instantiated by the hypervisor, which is loaded on underlying hardware. In this manner, the execution of the application is not necessarily coupled to specific hardware.

In some implementations, an application/video game may execute over a container, which abstracts at the application layer, packaging code and dependencies together, thus enabling software development agnostic of OS or hardware platform, and facilitating software portability across platforms.

In some implementations, a distributed game engine is employed wherein different parts of the game engine can be can be handled by different compute entities. For example, the functionality of the game engine such as physics engine, rendering engine (2D/3D graphics), sound, scripting, animation, AI, networking, streaming (encoding), memory management, threading, etc. can be divided into different functional processing blocks and/or services that are distributed among many different computes. It will be appreciated that for a distributed game engine, low-latency communication is required to avoid latency issues. To maintain desired frame rates, total time of computes and communication should meet certain constraints. Thus, it may or may not be efficient to divide certain tasks depending upon whether it is possible to complete the process in shorter time.

An advantage of using a distributed game engine is that it is possible to take advantage of elastic computing, wherein computing resources can be scaled up or down depending upon needs. For example, in a large multiplayer game executed traditionally on a single hardware server, after for example about 100 players, hardware resources become limited, so that more players cannot be added. The game may queue additional players, meaning that players must wait to join the game. However, with a distributed game engine, by using elastic cloud computing resources, more compute nodes can be added to meet demand, thus enabling for example thousands of players. The game is no longer constrained by the limits of a particular hardware server.

Thus, a cloud game engine can have functionality distributed to different processing entities. It will be appreciated that different functions can be executed in different frameworks. For example, some functions (e.g. social) might be easier to run in a container, whereas graphics might be better run using a VM connected to a GPU.

To facilitate distribution of the functionality of a cloud game engine, a distribution/synchronization layer can manage distribution of jobs, e.g. sending jobs out, receiving data back, identifying what tasks are performed and when, handling queueing e.g. if a job is finished faster than needed. In some implementations a given task could be dynamically subdivided if needed. For example, animation could have lighting, and if the lighting is especially complex, the lighting could be subdivided into three lighting jobs that are sent out for computing and reassembled upon return. Thus game engine functions can be subdivided if they require more work.

Cloud service providers provide computes at specified performance levels, for example in input/output operations per second ("IOPS"). Thus, a gaming provider may specify VMs, dedicated processing power, amount of memory, etc. from a cloud service provider and instantiate a distributed cloud gaming engine using the cloud service provider's systems.

In some implementations the library module and update handler can be one or more components or modules of a game engine. In some implementations, the library module and update handler can be separate components, or integrated. In some implementations the library module and update handler may operate as an addition to a game engine. In some implementations the game engine can be a distributed game engine, as noted above.

As noted, implementations of the disclosure can be applied to cloud gaming systems. One example of a cloud gaming system is the Playstation® Now cloud gaming system. In such a system, the client device can be a game console, such as a Playstation® 4 game console, or may be another device such as a personal computer, laptop, tablet, cell phone, mobile device, etc.

Broadly speaking, to enable cloud gaming, several operations are performed by one or more servers within a data center associated with a cloud gaming site when a user request is received for a game title. When the cloud gaming site receives a user request, a data center hosting the game associated with the selected game title is identified and the request is sent to the identified data center for instantiating the game for the selected game title. In response to the request, a server at the data center identifies the game code, loads the identified game code and initializes the files related to the game code in preparation for presenting the game content to the user. Game data associated with a game can include generic game data and user specific game data. Therefore, initializing the files can include identifying, loading, and initializing both generic game data and user specific game data. Initializing generic game data may include initializing a graphics engine, installing graphics data, initializing sound files, installing art work, etc. Initializing user specific data may include locating, transferring, and installing user data, user history, game history, etc.

While the generic game data is being loaded and initialized, a "splash" screen may be provided for rendering at the client device. A splash screen may be designed to provide representative images of the game that is being loaded, to allow a user a preview of the type of game that is being loaded. Once the generic game data is loaded, certain initial content may be rendered and a selection/navigation screen may be presented for user selection and customization. User selection input provided at the selection/navigation screen may include game level selection, game icon(s) selection, game mode selection, game winnings, and other user-related data that may require uploading of additional game content. In some embodiments, game content is made available by streaming the game content from the game cloud system to a user's computing device for viewing and interacting. In some implementations, after loading user specific data, the game content is available for game play.

Figure 8A:
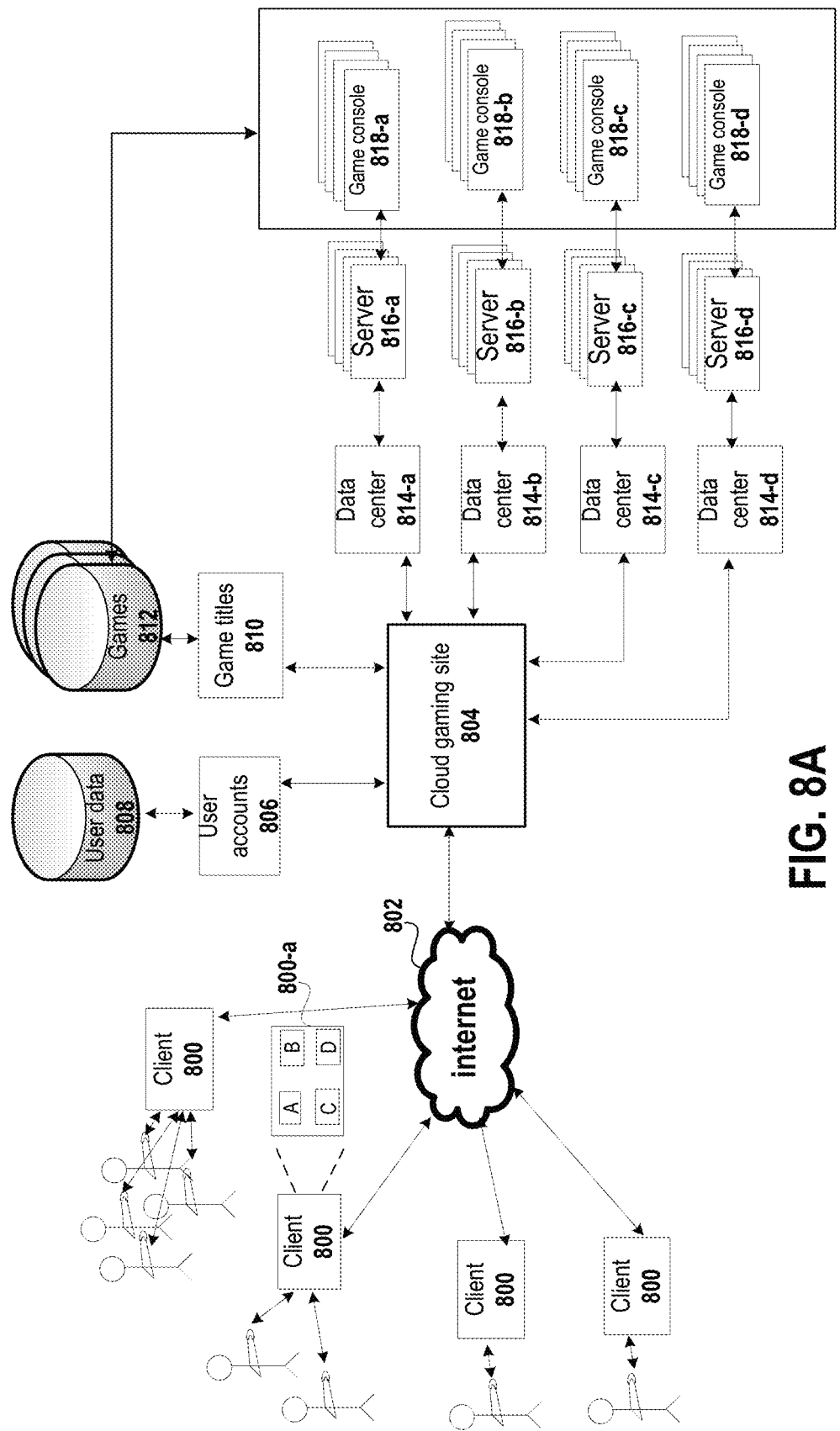
FIG. 8A illustrates an exemplary system used to load game files for a game available through a cloud gaming site, in accordance with implementations of the disclosure.

FIG. 8A illustrates an exemplary system used to load game files for a game available through a cloud gaming site. The system includes a plurality of client devices 800 that are communicatively connected to the cloud gaming site 804 over a network 802, which can include a LAN, wired, wireless, cellular (e.g. 4G, 5G, etc.), or any other type of data network, including the Internet. When a request to access the cloud gaming site 804 is received from a client device 800, the cloud gaming site 804 accesses user account information 806 stored in a user data store 808 to identify a user associated with a client device through which the request is initiated. In some embodiments, the cloud gaming site may also validate the identified user in order to determine all the games the user is authorized to view/play. Following user account identification/validation, the cloud gaming site accesses a game titles data store 810 to identify the game titles that are available at the game cloud site for the user account initiating the request. The game titles data store 810, in turn, interacts with a games database 812 to obtain the game titles for all the games that are available for the cloud gaming site. As new games are introduced, the games database 812 will be updated with the game code and the game titles data store 810 will be provided with game titles information for the newly introduced games. The client device from where the request is initiated may or may not be registered with the cloud gaming site, when the request was initiated. If the user of the client device initiating the request is not a registered user, then the cloud gaming site may identify the user as a new user and select the game titles (for e.g., a default set of game titles) that are appropriate for a new user. The identified game titles are returned to the client device for presenting on a display screen 800-a, as shown in FIG. 8A.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center where the game is being hosted and sends a signal to the identified data center to load the game associated with the game title for which the user interaction is detected. In some embodiments, more than one data center may be hosting the game. In such embodiments, the cloud gaming site may determine the geo location of the client device initiating the request and identify a data center that is geographically close to the client device and signal the data center to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server at the data center to instantiate the game on the server. The server is selected based on the hardware/software capabilities available and the game requirements. The server may include a plurality of game consoles and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated application, such as the game. Of course, the game console described above is exemplary and should not be considered restrictive. Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

Figure 8B:
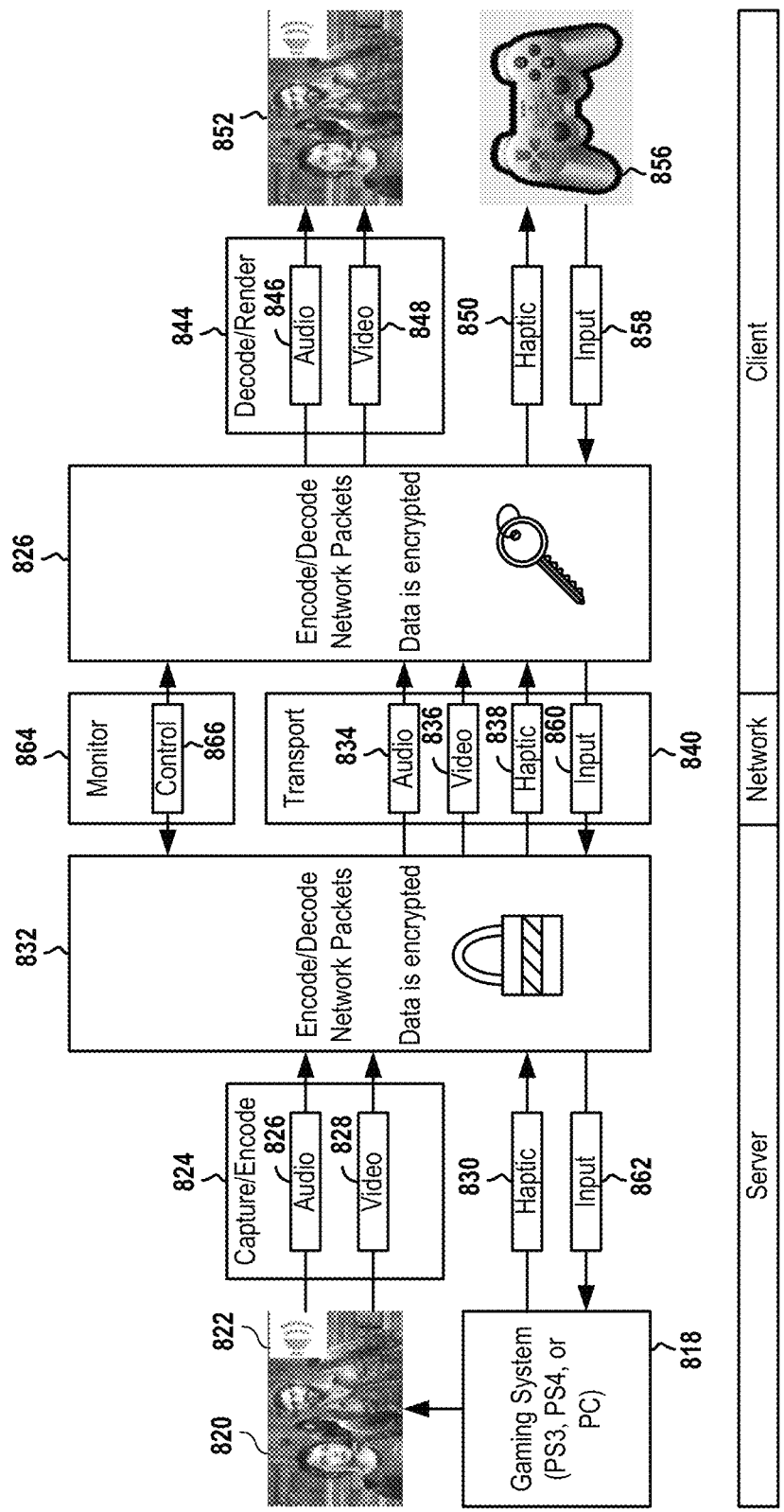
FIG. 8B is a flow diagram conceptually illustrating various operations which are performed for streaming a cloud video game to a client device, in accordance with implementations of the disclosure.

FIG. 8B is a flow diagram conceptually illustrating various operations which are performed for streaming a cloud video game to a client device, in accordance with implementations of the disclosure. The gaming system 818 executes a video game and generates raw (uncompressed) video 820 and audio 822. The video 820 and audio 822 are captured and encoded for streaming purposes, as indicated at reference 824 in the illustrated diagram. The encoding can provide for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

The encoded audio 826 and encoded video 828 are further packetized into network packets, as indicated at reference numeral 832, for purposes of transmission over a network such as the Internet. The network packet encoding process can also employ a data encryption process, thereby providing enhanced data security. In the illustrated implementation, audio packets 834 and video packets 836 are generated for transport over the network, as indicated at reference 840.

The gaming system 818 additionally generates haptic feedback data 830, which is also packetized into network packets for network transmission. In the illustrated implementation, haptic feedback packets 838 are generated for transport over the network, as further indicated at reference 840.

The foregoing operations of generating the raw video and audio and the haptic feedback data, encoding the video and audio, and packetizing the encoded audio/video and haptic feedback data for transport are performed on one or more servers which collectively define a cloud gaming service/system. As indicated at reference 840, the audio, video, and haptic feedback packets are transported over a network, such as and/or including the Internet. As indicated at reference 842, the audio packets 834, video packets 836, and haptic feedback packets 838, are decoded/reassembled by the client device to define encoded audio 846, encoded video 848, and haptic feedback data 850 at the client device. If the data has been encrypted, then the network packets are also decrypted. The encoded audio 846 and encoded video 848 are then decoded by the client device, as indicated at reference 844, to generate client-side raw audio and video data for rendering on a display device 852. The haptic feedback data 850 can be processed/communicated to produce a haptic feedback effect at a controller device 856 or other interface device through which haptic effects can be rendered. One example of a haptic effect is a vibration or rumble of the controller device 856.

It will be appreciated that a video game is responsive to user inputs, and thus, a similar procedural flow to that described above for transmission and processing of user input, but in the reverse direction from client device to server, can be performed. As shown, a user operating controller device 856 may generate input data 858. This input data 858 is packetized at the client device for transport over the network to the cloud gaming system. The input data packets 860 are unpacked and reassembled by the cloud gaming server to define input data 862 on the server-side. The input data 862 is fed to the gaming system 818, which processes the input data 862 to update the game state of the video game.

During transport (ref. 840) of the audio packets 834, video packets 836, and haptic feedback packets 838, the transmission of data over the network can be monitored to ensure the cloud game stream quality of service. For example, network conditions can be monitored as indicated by reference 864, including both upstream and downstream network bandwidth, and the game streaming can be adjusted in response to changes in available bandwidth. That is, the encoding and decoding of network packets can be controlled based on present network conditions, as indicated by reference 866.

Figure 9:
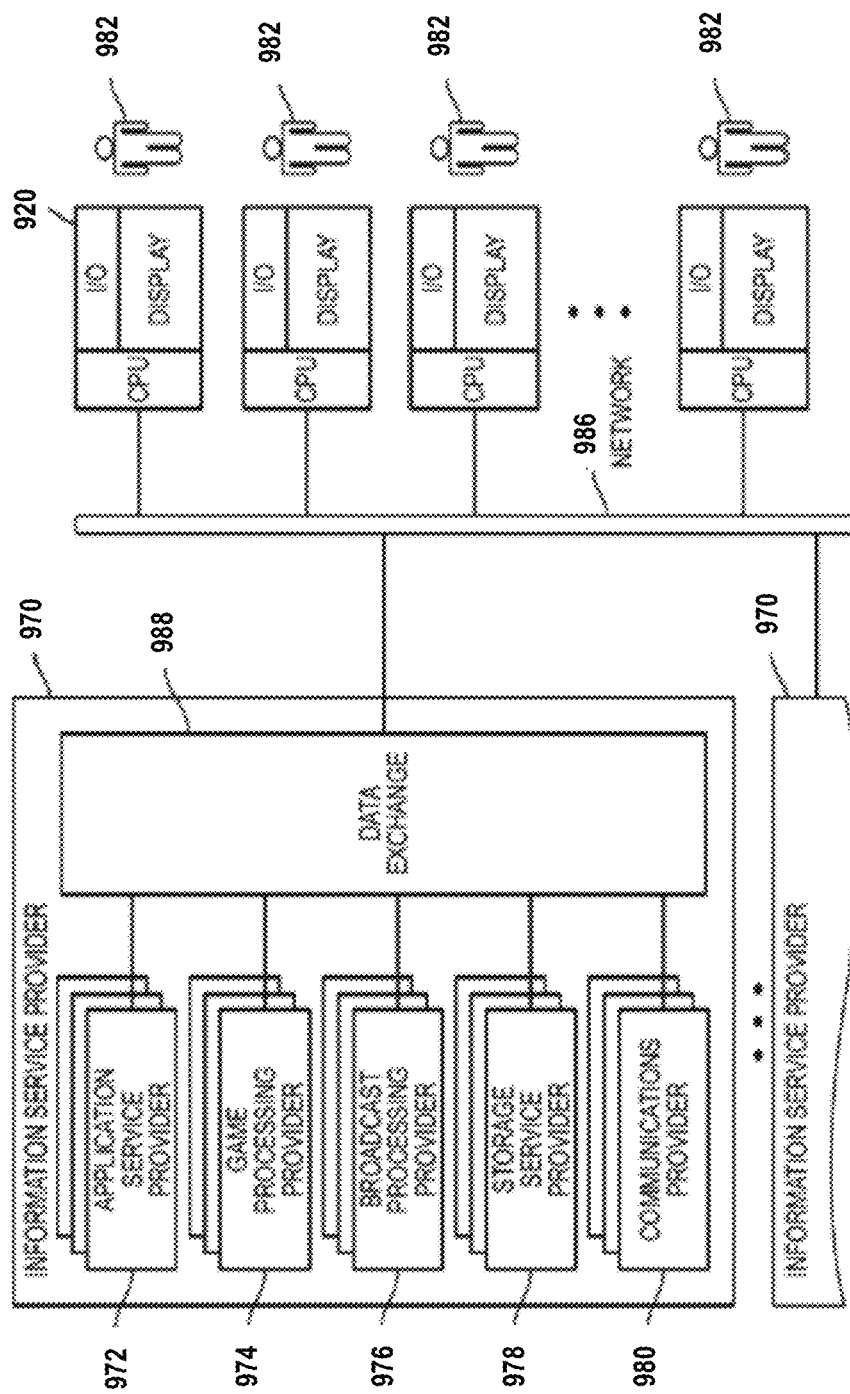
FIG. 9 illustrates an embodiment of an Information Service Provider architecture, in accordance with implementations of the disclosure.

FIG. 9 illustrates an embodiment of an Information Service Provider architecture. Information Service Providers (ISP) 970 delivers a multitude of information services to users 982 geographically dispersed and connected via network 986. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 970 includes Application Service Provider (ASP) 972, which provides computer-based services to customers over a network (e.g. including by way of example without limitation, any wired or wireless network, LAN, WAN, WiFi, broadband, cable, fiber optic, satellite, cellular (e.g. 4G, 5G, etc.), the Internet, etc.). Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 970 includes a Game Processing Server (GPS) 974 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 976 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 978 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 980 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 988 interconnects the several modules inside ISP 970 and connects these modules to users 982 via network 986. Data Exchange 988 can cover a small area where all the modules of ISP 970 are in close proximity, or can cover a large geographic area when the different modules are geographically dispersed. For example, Data Exchange 988 can include a fast Gigabit Ethernet (or faster) within a cabinet of a data center, or an intercontinental virtual area network (VLAN).

Users 982 access the remote services with client device 984, which includes at least a CPU, a memory, a display and I/O. The client device can be a PC, a mobile phone, a netbook, tablet, gaming system, a PDA, etc. In one embodiment, ISP 970 recognizes the type of device used by the client and adjusts the communication method employed. In other cases, client devices use a standard communications method, such as html, to access ISP 970.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the described embodiments.

What is claimed is:

1. A method, comprising:
receiving, over a network from a plurality of first client devices, videos generated from sessions of a video game respectively associated to the first client devices;
for each video, determining location metadata that identifies spatial locations in a virtual environment of the video game at which gameplay depicted by the video occurs, the spatial locations defining a path of the gameplay through the virtual environment for the video;
during a session of the video game associated to a second client device, determining a current spatial location in the virtual environment of gameplay occurring in the session;
filtering the videos based on the current spatial location to identify one or more of the videos having paths that intersect a region proximate to the current spatial location;
presenting, over the network, the identified one or more of the videos at the second client device;
continuously tracking updates to the current spatial location and responsively updating the filtering of the videos based on said updates to the current spatial location.

2. The method of claim 1, wherein the current spatial location in the virtual environment is defined by current spatial coordinates of a virtual character or a virtual object in the virtual environment.

3. The method of claim 1, wherein the location metadata that identifies spatial locations in the virtual environment is defined by spatial coordinates over time of a virtual character or a virtual object in the virtual environment.

4. The method of claim 1, wherein the location metadata identifies a chapter, level, or scene of the video game.

5. The method of claim 1, wherein filtering the videos based on the current spatial location includes identifying one or more of the videos having location metadata identifying a spatial location proximate to the current spatial location.

6. The method of claim 1, wherein presenting the selected videos includes displaying a preview image for each of the selected videos.

7. The method of claim 1, further comprising:
receiving a request for playback of one of the selected videos;
responsive to the request for playback, streaming the one of the selected videos to the second client device.

8. A method, comprising:
storing videos generated from first cloud-executed sessions of a video game respectively associated to a plurality of first client devices;
for each video, determining location metadata that identifies spatial locations in a virtual environment of the video game at which gameplay depicted by the video occurs, the spatial locations defining a path of the gameplay through the virtual environment for the video;
during a second cloud-executed session of the video game associated to a second client device, determining a current spatial location in the virtual environment of gameplay occurring in the second cloud-executed session;
filtering the videos based on the current spatial location to identify one or more of the videos having paths that intersect a region proximate to the current spatial location;
presenting, over the network, the identified one or more of the videos at the second client device;
continuously tracking updates to the current spatial location and responsively updating the filtering of the videos based on said updates to the current spatial location.

9. The method of claim 8, wherein the current spatial location in the virtual environment is defined by current spatial coordinates of a virtual character or a virtual object in the virtual environment.

10. The method of claim 8, wherein the location metadata that identifies spatial locations in the virtual environment is defined by spatial coordinates over time of a virtual character or a virtual object in the virtual environment.

11. The method of claim 8, wherein the location metadata identifies a chapter, level, or scene of the video game.

12. The method of claim 8, wherein filtering the videos based on the current spatial location includes identifying one or more of the videos having location metadata identifying a spatial location proximate to the current spatial location.

13. The method of claim 8, wherein presenting the selected videos includes displaying a preview image for each of the selected videos.

14. The method of claim 8, further comprising:
receiving a request for playback of one of the selected videos;
responsive to the request for playback, streaming the one of the selected videos to the second client device.

15. A method, comprising:
storing videos generated from first sessions of a video game respectively associated to a plurality of first client devices;
for each video, determining location metadata that identifies spatial locations in a virtual environment of the video game at which gameplay depicted by the video occurs, the spatial locations defining a path of the gameplay through the virtual environment for the video;
during a second session of the video game associated to a second client device, determining a current spatial location in the virtual environment of gameplay occurring in the session;
filtering the videos based on the current spatial location to identify one or more of the videos having paths that intersect a region proximate to the current spatial location;
presenting, over the network, the identified one or more of the videos at the second client device;
continuously tracking updates to the current spatial location and responsively updating the filtering of the videos based on said updates to the current spatial location.

16. The method of claim 15, further comprising:
determining a path of the gameplay occurring in the second session;
wherein presenting the identified one or more of the videos is prioritized based on a similarity of the path of the gameplay in the identified one or more of the videos to the path of the gameplay occurring in the second session.

17. The method of claim 15, further comprising:
for each video, determining a style of the gameplay depicted in the video;

determining a style of the gameplay occurring in the second session;

wherein presenting the identified one or more of the videos is prioritized based on a similarity of the style of the gameplay in the identified one or more of the videos to the style of the gameplay occurring in the second session.

18. The method of claim 15, wherein the current spatial location in the virtual environment is defined by current spatial coordinates of a virtual character or a virtual object in the virtual environment.

19. The method of claim 15, wherein the location metadata that identifies spatial locations in the virtual environment is defined by spatial coordinates over time of a virtual character or a virtual object in the virtual environment.

20. The method of claim 15, wherein the location metadata identifies a chapter, level, or scene of the video game.

* * * * *